(12) United States Patent
Baker et al.

(10) Patent No.: US 9,759,125 B2
(45) Date of Patent: Sep. 12, 2017

(54) EXHAUST TURBOCHARGER

(71) Applicant: JAGUAR LAND ROVER LIMITED, Warwickshire (GB)

(72) Inventors: Alan Baker, Coventry (GB); James Turner, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/895,553

(22) PCT Filed: Jun. 2, 2014

(86) PCT No.: PCT/EP2014/061344
§ 371 (c)(1),
(2) Date: Dec. 3, 2015

(87) PCT Pub. No.: WO2014/195256
PCT Pub. Date: Dec. 11, 2014

(65) Prior Publication Data
US 2016/0131021 A1    May 12, 2016

(30) Foreign Application Priority Data

Jun. 4, 2013 (GB) .................................. 1309914.8

(51) Int. Cl.
*F02B 33/00* (2006.01)
*F02B 37/02* (2006.01)
(Continued)

(52) U.S. Cl.
CPC ............ *F02B 37/025* (2013.01); *F02B 33/34* (2013.01); *F02B 37/12* (2013.01);
(Continued)

(58) Field of Classification Search
CPC ............................... F02B 37/025; F01D 9/026
(Continued)

(56) References Cited

U.S. PATENT DOCUMENTS 3,270,495 A * 9/1966 Connor ................. F02B 37/025
                                                         60/602
3,941,104 A * 3/1976 Egli ...................... F02B 37/025
                                                         60/600

(Continued)

FOREIGN PATENT DOCUMENTS

DE    102009050952 A1    5/2011
EP         1645735 A1    4/2006
(Continued)

OTHER PUBLICATIONS

Combined Search and Examination Report under Sections 17 and 18(3) for Application No. GB1309914.8 dated Dec. 5, 2013.
(Continued)

*Primary Examiner* — Phutthiwat Wongwian
*Assistant Examiner* — Ngoc T Nguyen
(74) *Attorney, Agent, or Firm* — Carlson, Gaskey & Olds

(57) ABSTRACT

An internal combustion engine (20) has two exhaust valves (24, 25) for each combustion chamber, to permit separation of blow-down and expulsion phases of an exhaust stroke. The separate exhaust streams are directed to different geometries of an exhaust turbocharger (30), so as to make best use thereof. Variable exhaust valve timing, and bypass passage for the exhaust streams are disclosed.

22 Claims, 3 Drawing Sheets

(51) Int. Cl.
*F02B 33/34* (2006.01)
*F02D 13/02* (2006.01)
*F02D 23/00* (2006.01)
*F02D 41/00* (2006.01)
*F02B 37/12* (2006.01)

(52) U.S. Cl.
CPC ..... *F02D 13/0249* (2013.01); *F02D 13/0257* (2013.01); *F02D 23/00* (2013.01); *F02D 41/0007* (2013.01); *F02D 2041/001* (2013.01); *Y02T 10/144* (2013.01); *Y02T 10/18* (2013.01)

(58) Field of Classification Search
USPC .......................................................... 60/602
See application file for complete search history.

(56) References Cited

U.S. PATENT DOCUMENTS

| | | | | |
|---|---|---|---|---|
| 6,883,319 | B2* | 4/2005 | Ekenberg | F02B 37/02 60/602 |
| 2003/0000211 | A1 | 1/2003 | Drangel et al. | |
| 2007/0089415 | A1* | 4/2007 | Shimokawa | F02B 37/025 60/605.1 |
| 2009/0041573 | A1* | 2/2009 | Serres | F01D 17/141 415/51 |
| 2009/0041577 | A1* | 2/2009 | Serres | F01D 9/026 60/598 |
| 2010/0077746 | A1* | 4/2010 | Gray, Jr. | F02B 37/02 60/604 |
| 2013/0000300 | A1* | 1/2013 | O'Hara | F02B 37/025 60/605.1 |
| 2013/0047606 | A1 | 2/2013 | Kuhn et al. | |
| 2014/0338328 | A1* | 11/2014 | Lusardi | F01D 9/026 60/605.2 |

FOREIGN PATENT DOCUMENTS

| | | |
|---|---|---|
| EP | 2101047 A1 | 9/2009 |
| EP | 2119888 A2 | 11/2009 |
| FR | 2916226 A3 | 11/2008 |
| JP | S58130028 U | 9/1983 |
| JP | S60125727 A | 7/1985 |
| JP | 2012092682 A | 5/2012 |
| WO | 2013150092 A1 | 10/2013 |

OTHER PUBLICATIONS

International Search Report and Written Opinion of the International Searching Authority for International application No. PCT/EP2014/061344 dated Jul. 21, 2014.

* cited by examiner

EXHAUST TURBOCHARGER

TECHNICAL FIELD

This invention relates to an exhaust turbocharger and in particular, but not exclusively, to such a turbocharger provided in conjunction with a gasoline engine. Aspects of the invention relate to a combination, to an apparatus, to a vehicle and to a method.

BACKGROUND OF THE INVENTION

An exhaust turbocharger comprises a turbine driven by the exhaust gas stream, and a compressor driven by the turbine to increase the volume of intake air in to the engine. As a result more fuel can be burnt in each combustion event, and the power output can be increased. Such turbochargers are a common feature on internal combustion engines.

A simple exhaust turbocharger is characterised by a fixed aspect ratio for the turbine. This aspect ratio can be optimum for only one engine speed and load, and accordingly requires a compromise between lack of boost at low engine speed/low exhaust gas flow rate, and too much boost at high engine speed/high exhaust gas flow. In the latter case, excess boost can be relieved via a wastegate, but energy is not then recovered from the wasted stream.

Variable geometry exhaust gas turbochargers have been proposed whereby the turbine volute geometry is altered in accordance with engine speed. This arrangement allows the geometry to be optimised to some extent across a range of engine speed, and may permit the turbo charger to be effective at both low and high engine speeds.

Variable geometry turbochargers may provide better space utilisation than two or three stage turbochargers, where gas is for example directed sequentially to one turbine after another according to engine speed, each turbocharger being optimised for a particular range of engine speed.

Typically a variable geometry turbocharger incorporates a nozzle arrangement for directing the exhaust gas stream onto the turbine, and the angle of incidence of the exhaust gas stream is changed according to engine speed. Actuation of the nozzle arrangement may be for example by vacuum actuator or electric stepper motor.

At lower engine speeds, the angle of incidence is more orthogonal to the blade of the turbine, and at higher engine speeds, the angle of incidence is less orthogonal. However, at lower engine speeds, and an optimum angle of incidence, the back pressure generated upstream of the turbine may be significant enough to prevent effective expulsion of combustion gases from the engine on the exhaust stroke. In turn this may reduce the knock margin in a gasoline engine. The alternative is to lower the back pressure upstream of the turbine, but this has the effect of reducing energy recovery from the exhaust gas stream.

A further problem in gasoline engines with exhaust turbochargers is the requirement to separate the exhaust pulsations in a multi-cylinder reciprocating piston engine. This is necessary to avoid interaction of pressure waves as respective exhaust valves open, which may detrimentally affect cylinder scavenging on the exhaust stroke. One solution to this problem is to use a pulse divided manifold which separates the exhaust tracts of cylinders that may interfere (according to the firing order), and directs the two exhaust tracts to different inlet channels of the turbocharger turbine—a so-called twin-scroll turbocharger.

In an internal combustion engine, the exhaust event may be considered as comprising two sequential phases. Firstly a high pressure pulse occurs as the exhaust valve opens, and combustion chamber pressure drops rapidly—this phase may be termed "blow-down", and has a short time span.

Subsequently the exhaust gases are expelled from the cylinder/combustion chamber on the exhaust stroke at a lower pressure—this phase may be called "expulsion" and has a relatively long time span. A conventional variable geometry exhaust turbine tends to adversely affect expulsion.

GB-A-2423797 (Lotus) discloses a multi-cylinder internal combustion engine having two exhaust valves per cylinder, the exhaust valves having respective exhaust tracts connected one each to an exhaust turbocharger and to an exhaust turbo compounder.

SUMMARY OF THE INVENTION

According to one aspect of the invention there is provided an internal combustion engine and exhaust turbocharger, said engine having a combustion chamber with two exhaust ports, each exhaust port having a respective exhaust valve for controlling the flow therethrough, wherein respective exhaust ports are coupled via respective exhaust tracts to respective turbine inlets of said exhaust turbocharger, whereby the turbine geometries associated with each exhaust tract are distinct.

By providing for two separate exhaust tracts from each combustion chamber, the blow-down and expulsion phases may be separated by suitable timing of the respective exhaust valves, and directed to a turbine or part of a turbine having a suitable turbine geometry. Thus, the blow-down phase, which tends to have a higher pulsation amplitude of both mass flow and pressure, is directed to a turbine geometry designed to take best advantage thereof. The expulsion phase tends to have a low pulsation amplitude of both mass flow and pressure, and is directed to a turbine geometry designed to take best advantage thereof.

In a reciprocating piston engine, the valve timing of the respective exhaust valves may vary according to opening time (with respect to crank angle), opening duration, and opening area (valve lift of a poppet valve). These factors are typically determined by the cam profile of a poppet valve cam shaft, and may be fixed. Alternatively, a variable valve timing system may be incorporated whereby some or all of the parameters of valve timing may be altered according to, for example, the outputs of an electronic engine management system.

The invention is particularly suitable for gasoline engines, but may also have application to diesel engines.

In an embodiment of the invention, a variable valve timing system may be provided for each exhaust valve.

Typically the invention will be applied to a multi-cylinder engine, in which case two exhaust valves are provided for each combustion chamber, and associated one with each exhaust tract. The exhaust valves are thus arranged in two groups, and have common timing for each group, so that each cylinder of the engine behaves identically in steady state conditions.

The distinct turbine geometries associated with each exhaust tract may be provided in several ways.

In one embodiment a single turbine wheel is provided having straight (constant angle) vanes; however the inlet paths of the turbocharger direct exhaust gas to the vanes at a different angle. Alternatively, the turbine inlet guide vanes can be curved, and the inlet paths arranged side by side and substantially parallel. In another embodiment a combination of these features is provided whereby the inlet paths are non-parallel, and the turbine vanes are curved.

A desired gas impingement angle may be achieved by use of a turbine volute associated with each exhaust tract.

In another embodiment distinct turbine wheels may be provided side by side on a common turbine shaft, each turbine being associated with a different exhaust tract so as to present distinct turbine geometries. In this arrangement the turbines may have straight or curved blades, and the inlet paths for exhaust gas (nozzle angle) may be parallel or not.

Generally speaking, the respective turbine geometries may be selected using any appropriate variable, for example, selected from aspect ratio, turbine volute shape (length from zero point, cross-section etc) nozzle angle and blade profile.

In an embodiment of the invention, one or both turbine geometries is variable. Thus, using conventional means, the turbine geometry may vary according to, for example, engine speed, torque demand or same other relevant factor under the control of an electronic engine management system.

Turbine geometry may for example vary by altering the angle of incidence of gas impingement on the turbine blades, by shuttering an exhaust gas nozzle or by moving a directional turbine inlet valve, or nozzle.

According to a second aspect of the invention, there is provided a method of operating an internal combustion engine and exhaust turbocharger in combination and according to any preceding claim, the method comprising substantially separating the exhaust blow-down and exhaust expulsion phases of an exhaust stroke, and directing said phases to different geometries of a turbine wheel of said turbocharger.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Other features of the invention will be apparent from the following description of several embodiments shown by way of example only in the accompanying drawings in which:—

DESCRIPTION OF EMBODIMENTS

Figure 1:
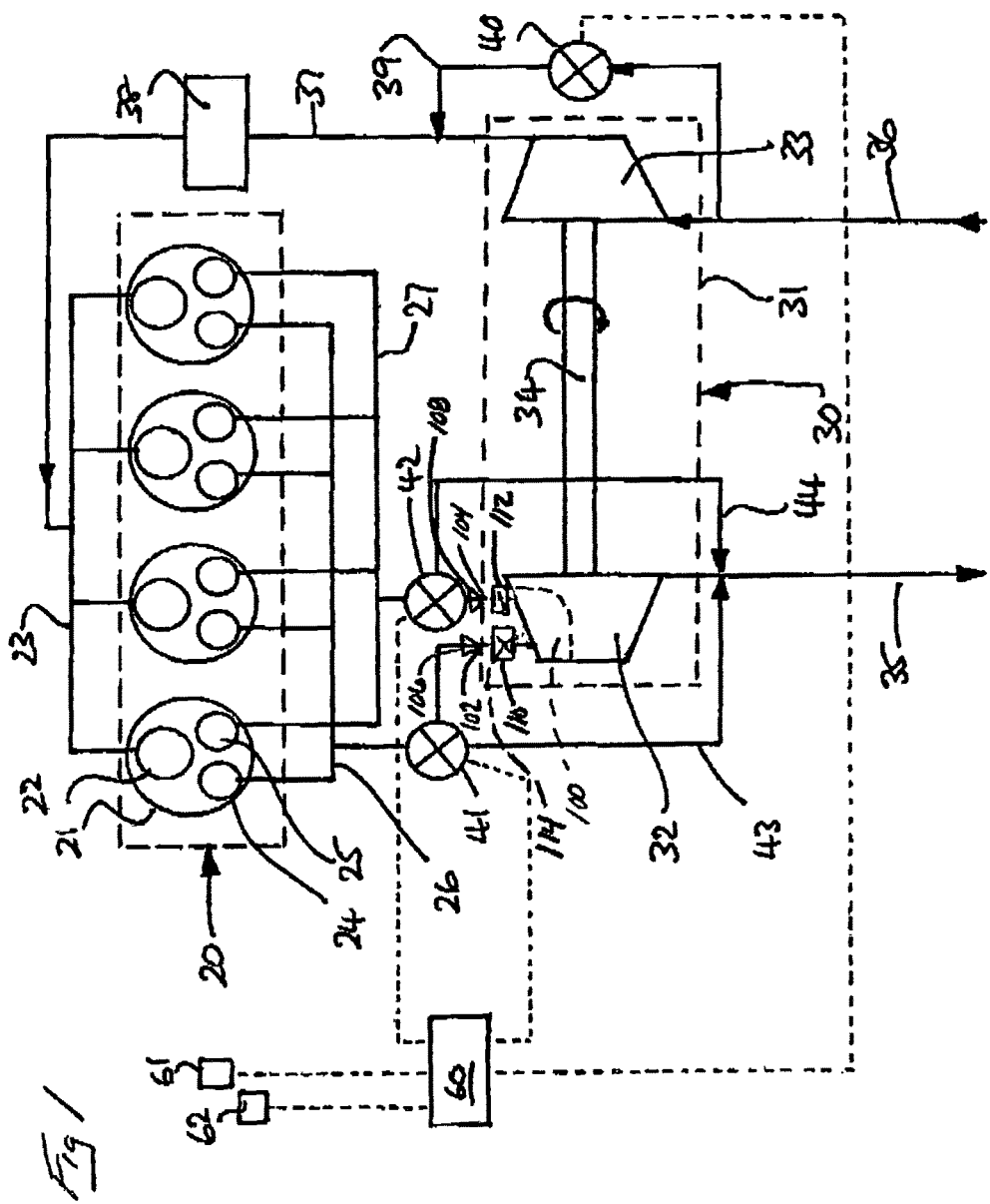
FIG. 1 is a schematic illustration of a first embodiment of the invention.

A first embodiment of the invention is illustrated in FIG. 1, and comprises a four cylinder, in-line, reciprocating piston, internal combustion engine 20 having four identical cylinders 21 each with an inlet valve 22 coupled to an inlet manifold 23, and two exhaust valves 24, 25 coupled to respective exhaust manifolds 26, 27. The number of inlet valves 22 is not important in this invention, and for simplicity only one per cylinder is shown; more could be provided if desirable. The exhaust manifolds 26, 27 define independent exhaust tracts, so that the exhaust stream is divided immediately downstream of each cylinder. The valves are typically conventional spring loaded poppet valves, opened and closed by a suitable camshaft arrangement.

In this embodiment, the operation of one or both sets of exhaust valves is controlled by one or more variable devices of known kind which may vary the timing of valve opening and closing with respect to an engine output member (typically crank angle), and/or may vary the duration of opening, and/or may vary the size of the aperture defined by a valve during the period for which it is open. Thus for a poppet valve, the valve lift may be adjusted to more or less throttle the flow of exhaust gas therethrough, and accordingly to permit flow of exhaust gas from the cylinder more or less quickly.

Valves may be operated in unison by, for example, a camshaft. Valves may also be operated by individual actuators, in which case each set of individual actuators may be operated in unison. This invention is not concerned with variable valve timing as such.

In an embodiment, the exhaust valves associated with each exhaust manifold are operated in common, thus with the same characteristics of timing, duration and aperture. However the two sets of exhaust valves will typically have different operating characteristics. For example the set of exhaust valves associated with the blow-down phase will open earlier and close earlier than the set of exhaust valves associated with the expulsion phase; there may be a period of overlap where both valves of each combustion chamber are open.

An exhaust turbocharger 30 is provided downstream of the exhaust manifolds 26,27, and within a common housing 31 the usual exhaust turbine wheel 32 connected to the usual inlet tract compressor wheel 33 by a shaft 34. This invention is not concerned with exhaust turbochargers as such, and further details of the general design thereof are omitted.

The outlet of the turbine is directed to an exhaust tailpipe 35. The compressor wheel 33 has an inlet 36 for receiving fresh air, and an outlet 37 connected to the inlet manifold via a conventional intercooler (charge air cooler) 38. The compressor wheel 33 includes a bypass passage 39 which is opened and closed by actuation of a bypass valve 40. The passage 39 is conventional, and allows inlet air to bypass the compressor wheel when stationary to improve natural (unassisted) aspiration. the bypass valve 40 may also provide a conventional blow-off or surge valve whereby excess inlet pressure downstream of the compressor wheel may be vented to the inlet side, or to atmosphere (not shown).

On the exhaust side, each exhaust manifold 26,27 is coupled to a respective exhaust valve 41,42 whereby the exhaust gas stream may be directed either to the turbine 32 through a nozzle 102, 104 associated with respective inlets to the turbine 32, or via a respective bypass passage 43,44 to the exhaust tail pipe 35. The exhaust bypass passages 43,44 allow the respective exhaust gas streams to have a greater or lesser effect on the turbine 32, as will be explained.

Typically the operation of the bypass valves 40, 41, 42, and the variable valve timing arrangement 61,62 are under the control of a device such as a camshaft or an electronic control unit (ECU) (either schematically represented at) 60 according to conventional systems of engine management, whereby an operating map determines operational parameters according to e.g. engine speed and load.

Thus, in use the engine 20 is typically capable of operation over an operating range, from tickover at minimum speed to maximum power at maximum speed. Various operating parameters of the engine are typically adjusted, in particular valve timing, ignition timing and fuelling, to provide an appropriate operating characteristic, with minimum fuel consumption and minimum undesirable emissions. Such adjustments are generally not apparent to the driver of the vehicle.

Operation of this embodiment of the invention is as follows:

At lower engine speed/low load, it is desirable to extract as much energy from the exhaust gas stream as possible, so as to provide the highest possible inlet charge pressure via the compressor wheel 33. With two exhaust gas streams, via the manifolds 26,27 the possibilities for energy extraction are increased.

In the blow-down phase, a high pressure pulse of short duration is available, and can be directed to an aggressive turbine geometry best able to take advantage thereof. This pulse may for example be directed via exhaust valves 24, manifold 26 and valve 41. At the conclusion of the blow-down phase, the exhaust valves 24 will close, and accordingly the aggressive turbine geometry is no longer supplied with an exhaust gas stream.

However, as the exhaust valve 24 closes, the exhaust valves 25 are opened to permit the longer expulsion phase to provide a comparatively steady flow of exhaust gas via the manifold 27 and valve 42 to a less aggressive turbine geometry.

By this means energy extraction is maximised whilst avoiding excessive back pressure on the combustion chamber. In contrast, use of an aggressive turbine geometry would allow effective energy conversion in the blow-down phase but impose excessive back pressure in the expulsion phase. On the other hand, a benign turbine geometry would be effective in the expulsion phase, but cause excess pressure to be vented (for example) via a conventional wastegate) in the blow-down phase. In the latter case energy is lost to the exhaust tailpipe, and moreover back pressure on the combustion chamber is high due to the large pressure drop across the wastegate valve.

The variable valve timing modules 61,62 ensure that parameters of valve timing and overlap are in accordance with a pre-determined operating regime, which may be determined empirically on, for example, an engine test bed and retained in an engine management system according to conventional practices. Thus the closing of one set of exhaust valves may overlap the opening of another set of exhaust valves to provide for maximum extraction of energy from the exhaust gas stream.

In certain instances it may be desirable to wholly or partially bypass the turbine wheel, for example to reduce back pressure on the combustion chamber, or to ensure rapid "light-off" of the usual catalytic converter upon cold engine start.

At higher engine speeds and loads, the proportion of exhaust gas directed to the respective turbine geometries may change, according to exhaust valve timing, and operation of the exhaust bypass valves 41,42, so as to optimise the extraction of energy from the exhaust gas stream.

In the embodiment of FIG. 1, a single turbine housing and a single turbine wheel is envisaged. The turbine housing is divided to separate the exhaust gas streams up to the entrance to the turbine wheel.

As compared with a pulse divided manifold and twin scroll turbine, which is used to avoid exhaust events in one cylinder affecting an exhaust event in another cylinder, the present invention obviates such interference by providing separate paths for the blow-down and expulsion phases of an exhaust stroke. As a result exhaust valve pulsation events are able to overlap because cross-communication between cylinders can be avoided.

As noted above, the different turbine geometries may vary by changing one or more parameters, such as aspect ratio, nozzle outlet size and direction etc.

In an enhanced embodiment one or both of the turbine geometries may itself be variable, by using an actuator under control of the ECU 60 to change one or more parameters such as aspect ratio, nozzle outlet size and direction etc.

It will be appreciated that for any group of cylinders, the allowable length of blow-down and expulsion phases is determined by:

maximum length of blow-down (in arc degrees of crank rotation)=720/no. of cylinders feeding the exhaust manifold maximum length of expulsion (in arc degrees of crank rotation)=720/no. of cylinders feeding the exhaust manifold.

Figure 2:
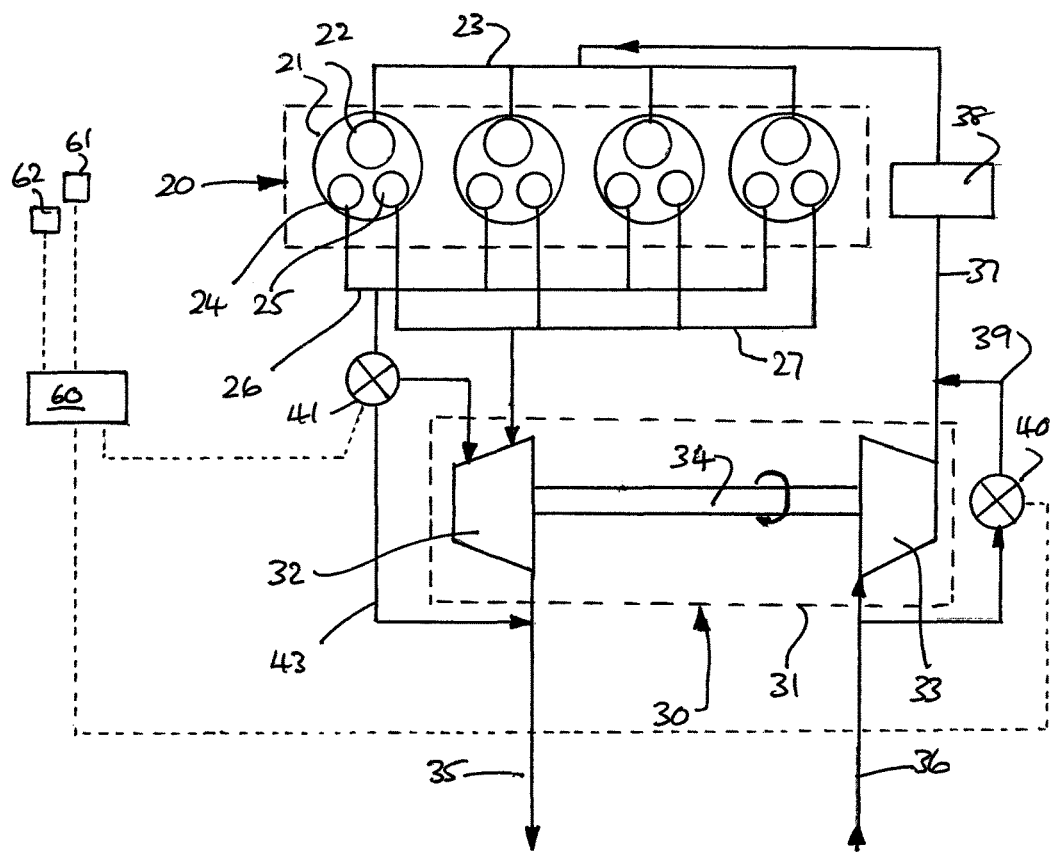
FIG. 2 is a schematic illustration of a second embodiment of the invention.

FIG. 2 illustrates an alternative embodiment in which the bypass valve 42 is omitted, along with the corresponding bypass passage 44. This simplified arrangement may be appropriate where, for example bypass in the expulsion phase is not required. Such a construction may be less expensive, and less consuming of space in the engine compartment.

Figure 3:
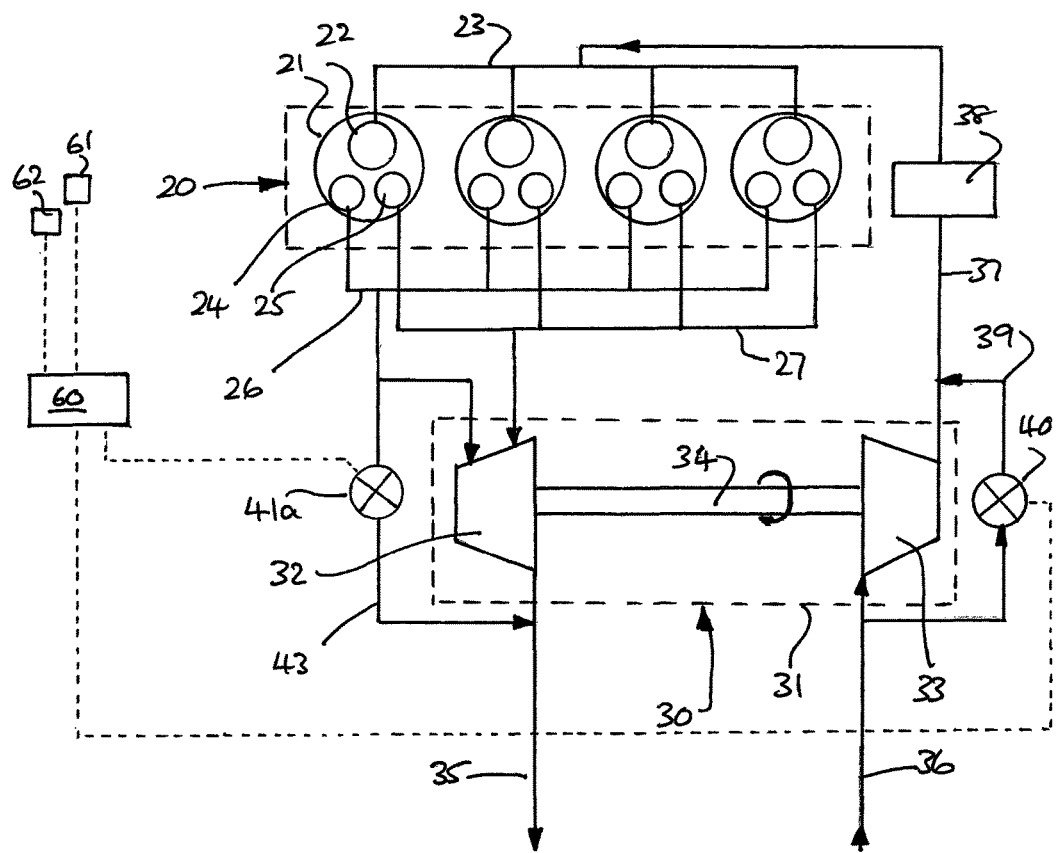
FIG. 3 is a schematic illustration of a third embodiment of the invention.

FIG. 3 shows another embodiment, similar to FIG. 2, but in which the single bypass valve 41a is located downstream of the branch to the turbine. By this means all of the flow from manifold may be directed to the turbine wheel 32, or most thereof via the bypass passage to the exhaust tailpipe.

The valves 41,42 are typically proportional valves allowing flow to be divided in any proportion between the two outlets. Such valves are well known, and may be controlled by, for example, a vacuum or an electrical actuator. The valve 41a is similar, save that it controls the proportion flowing through the single outlet thereof, and the proportion directed to the turbocharger is an inevitable consequence.

Certain aspects of the invention are stated in the numbered paragraphs which follow:—

1. An internal combustion engine and exhaust turbocharger in combination, said engine having a combustion chamber with two exhaust ports, each exhaust port having a respective exhaust valve for controlling the flow therethrough, wherein respective exhaust ports are coupled via respective exhaust tracts to respective turbine inlets of said exhaust turbocharger, whereby the turbine geometries associated with each exhaust tract are distinct.

2. The combination of aspect 1 wherein said turbocharger has a single turbine wheel.

3. The combination of aspects 1 or 2 wherein the vanes 100 of the turbine wheel 32 are arcuate.

4. The combination of aspect 1 wherein a turbine inlet 102, 104 comprises a nozzle 106, 108.

5. The combination of aspect 4 wherein the turbine inlets comprise respective nozzles.

6. The combination of aspect 5 wherein the outlet direction of said nozzle is non-parallel.

7. The combination of aspect 4 wherein a nozzle comprises means to vary the outlet direction thereof.

8. The combination of aspect 1 wherein a turbine inlet 102, 104 includes a stator 110, 112 having one or more vanes 114 to direct an exhaust stream.

9. The combination of aspect 8 wherein the turbine inlets comprise a respective stator.

10. The combination of aspect 8 wherein a stator is movable to change the direction of an exhaust stream.

11. The combination of aspect 1 wherein said engine comprises a variable exhaust valve timing system whereby the opening duration of one or more exhaust valves may be changed.

12. The combination of aspect 1 wherein said engine comprises a variable exhaust valve timing system whereby the opening area of one or more exhaust valves may be changed.

13. The combination of aspect 1 wherein said engine comprises a variable exhaust valve timing system whereby the timing of opening and/or closing of one or more exhaust valves may be varied with respect to the rotation of an output member of said engine.

14. The combination of aspect 1 wherein one of said exhaust tracts includes a diverter valve having an inlet from said engine and an outlet for connection to the downstream exhaust side of said turbocharger.

15. The combination of aspect 14 wherein said diverter valve has an inlet from said engine, a first outlet to said turbocharger, and a second outlet for connection to a bypass of said turbocharger.

16. The combination of aspect 15 wherein both said exhaust tracts include a said diverter valve.

17. A combination according to aspect 1 wherein said engine has multiple cylinders.

18. A combination according to aspect 17 wherein said engine has four cylinders in line.

19. A vehicle incorporating an engine and turbocharger in combination, according to aspect 1.

20. A method of operating an internal combustion engine and exhaust turbocharger in combination and according to any preceding claim, the method comprising substantially separating the exhaust blow-down and exhaust expulsion phases of an exhaust stroke, and directing said phases to different geometries of a turbine wheel of said turbocharger.

21. The method of aspect 20 including the step of varying the timing of exhaust valves according to engine speed and load, to vary the proportion of exhaust gas directed to said different geometries.

22. The method of aspect 21 including the step of diverting to the downstream exhaust side of said turbocharger a proportion of exhaust gas from one or both said phases.

The invention claimed is:

1. A method of operating an internal combustion engine and exhaust turbocharger in combination, said engine having a combustion chamber with first and second exhaust orts, the first exhaust port having a first exhaust valve for controlling flow of exhaust gas through the first exhaust port and the second exhaust port having a second exhaust valve for controlling flow of exhaust gas through the second exhaust port, wherein the first and second exhaust ports are coupled via respective first and second exhaust tracts to respective first and second turbine inlets of said exhaust turbocharger, wherein turbine geometries associated with said first and second exhaust tracts are distinct, the method comprising:
controlling at least one of a cam shaft and a variable valve timing system to separate exhaust blow-down and exhaust expulsion phases of an exhaust stroke of the engine;
directing gas exhausted from the combustion chamber during said blow-down chase of said exhaust stroke to a first of the distinct turbine geometries via the first turbine inlet and the first exhaust port; and
directing gas exhausted from the combustion chamber during said expulsion phase of said exhaust stroke to a second of the distinct turbine geometries via the second turbine inlet and the second exhaust port.

2. The method of claim 1, including varying the timing of the exhaust valves according to engine speed and load, to vary a proportion of exhaust gas directed to said different geometries.

3. The method of claim 2, including diverting to a downstream exhaust side of a turbine wheel of said turbocharger a proportion of exhaust gas from one or both said phases.

4. A system, comprising;
an internal combustion engine and an exhaust-driven turbine, said engine having a combustion chamber with first and second exhaust ports, the first exhaust port having a first exhaust valve for controlling flow of exhaust gas through the first exhaust port and the second exhaust port having a second exhaust valve for controlling flow of exhaust gas through the second exhaust port, wherein the first and second exhaust ports are coupled via respective first and second exhaust tracts to respective first and second turbine inlets of said exhaust-driven turbine, wherein turbine geometries associated with said first and second exhaust tracts are distinct,
wherein an electronic control unit (ECU) is configured to control at least one of a cam shaft and a variable valve timing system to separate exhaust blow-down and exhaust expulsion phases of an exhaust stroke by:
directing gas exhausted from the combustion chamber during said exhaust blow-down phase of said exhaust stroke to a first turbine geometry of the distinct turbine geometries via the first turbine inlet and the first exhaust port, and
directing gas exhausted from the combustion chamber during said expulsion phase of said exhaust stroke to a second turbine geometry of the distinct turbine geometries via the second turbine inlet and the second exhaust port.

5. A system, comprising:
an internal combustion engine;
an exhaust turbocharger, said engine having a combustion chamber with first and second exhaust ports, the first exhaust port having a first exhaust valve for controlling flow of exhaust gas through the first exhaust port and the second exhaust port having a second exhaust valve for controlling flow of exhaust gas through the second exhaust port, wherein the first and second exhaust ports are coupled via respective first and second exhaust tracts to respective first and second turbine inlets of said exhaust turbocharger, wherein turbine geometries associated with said first and second exhaust tracts are distinct; and
an electronic control unit (ECU) configured to control at least one of a cam shaft and a variable valve timing system to separate exhaust blow-down and exhaust expulsion phases of an exhaust stroke by:
directing gas exhausted from the combustion chamber during said exhaust blow-down phase of said exhaust stroke to a first turbine geometry of the distinct turbine geometries via the first turbine inlet and the first exhaust port, and
directing gas exhausted from the combustion chamber during said expulsion phase of said exhaust stroke to a second turbine geometry of the distinct turbine geometries via the second turbine inlet and the second exhaust port.

6. The system as claimed in claim 5, wherein vanes of the turbine wheel are arcuate.

7. The system as claimed in claim 5, wherein one of said first and second turbine inlets comprises a nozzle.

8. The system as claimed in claim 7, wherein the first and second turbine inlets comprise respective nozzles.

9. The system as claimed in claim 8, wherein an outlet direction of the nozzle associated with the first turbine inlet is non-parallel to an outlet direction of the nozzle associated with the second turbine inlet.

10. The system as claimed in claim 7, wherein one of said nozzles comprises an actuator controllable to vary the outlet direction of the one of said nozzles.

11. The system as claimed in claim 5, wherein one of said first and second turbine inlets includes a stator having one or more vanes to direct an exhaust stream.

12. The system as claimed in claim 11, wherein the first and second turbine inlets each comprise a respective stator.

13. The system as claimed in claim 11, wherein the stator is movable to change a direction of an exhaust stream.

14. The system as claimed in claim 5, wherein the ECU is configured to change an opening duration of at least one of said first and second exhaust valves.

15. The system as claimed in claim 5, wherein the ECU is configured to change an opening area of at least one of said first and second exhaust valves.

16. The system as claimed in claim 5, wherein the ECU is configured to vary a timing of opening and/or closing of one or more of said first and second exhaust valves with respect to the rotation of an output member of said engine.

17. The system as claimed in claim 5, wherein one of said exhaust tracts includes a diverter valve having an inlet from said engine and an outlet for connection to a downstream exhaust side of a turbine wheel of said turbocharger.

18. The system as claimed in claim 17, wherein said diverter valve has an inlet from said engine, a first outlet to said turbocharger, and a second outlet for connection to a bypass of a turbine wheel of said turbocharger.

19. The system as claimed in claim 5, wherein both said exhaust tracts includes a diverter valve, each diverter valve having an inlet from said engine and an outlet for connection to a downstream exhaust side of a turbine wheel of said turbocharger.

20. The system as claimed in claim 5, wherein said engine has multiple cylinders.

21. The system as claimed in claim 20, wherein said engine has four cylinders in line.

22. A vehicle incorporating the system of claim 5.

* * * * *

UNITED STATES PATENT AND TRADEMARK OFFICE
CERTIFICATE OF CORRECTION

| | | |
|---|---|---|
| PATENT NO. | : 9,759,125 B2 | Page 1 of 1 |
| APPLICATION NO. | : 14/895553 | |
| DATED | : September 12, 2017 | |
| INVENTOR(S) | : Alan Baker and James Turner | |

It is certified that error appears in the above-identified patent and that said Letters Patent is hereby corrected as shown below:

In the Claims

In Claim 1, Column 7, Line 46; replace "orts" with --ports--

In Claim 1, Column 7, Line 61; replace "blow-down chase" with --blow-down phase--

Signed and Sealed this
First Day of February, 2022

Drew Hirshfeld
*Performing the Functions and Duties of the*
*Under Secretary of Commerce for Intellectual Property and*
*Director of the United States Patent and Trademark Office*